United States Patent
Konno et al.

(10) Patent No.: US 11,590,421 B2
(45) Date of Patent: Feb. 28, 2023

(54) TRAVEL OF VIRTUAL CHARACTERS (71) Applicants: Niantic, Inc., San Francisco, CA (US); Niantic International Technology Limited, Bristol (GB)

(72) Inventors: Shohei Konno, Tokyo (JP); Keita Tsutsui, Tokyo (JP); Tatsuo Nomura, Tokyo (JP); Hiroki Asakawa, Tokyo (JP); Shigeru Miyamoto, Kyoto (JP); Motoki Yano, Kyoto (JP)

(73) Assignee: Niantic, Inc., San Francisco, CA (US)

( * ) Notice: Subject to any disclaimer, the term of this patent is extended or adjusted under 35 U.S.C. 154(b) by 0 days.

(21) Appl. No.: 17/215,859

(22) Filed: Mar. 29, 2021

(65) Prior Publication Data
US 2022/0305385 A1 Sep. 29, 2022

(51) Int. Cl.
*A63F 13/56* (2014.01)
*A63F 13/35* (2014.01)
*A63F 13/216* (2014.01)

(52) U.S. Cl.
CPC ............ *A63F 13/56* (2014.09); *A63F 13/216* (2014.09); *A63F 13/35* (2014.09)

(58) Field of Classification Search
CPC ........ A63F 13/56; A63F 13/216; A63F 13/35; A63F 13/65
USPC ......................................................... 463/31
See application file for complete search history.

(56) References Cited

U.S. PATENT DOCUMENTS

| 8,968,099 | B1 | 3/2015 | Hanke et al. |
| 10,646,783 | B1 | 5/2020 | Hibbert et al. |
| 10,761,180 | B1* | 9/2020 | Nocon .................... H04W 4/80 |
| 2011/0319148 | A1 | 12/2011 | Kinnebrew et al. |
| 2015/0170455 | A1 | 6/2015 | Rad et al. |

(Continued)

FOREIGN PATENT DOCUMENTS

| CN | 102958573 B | 6/2016 |
| CN | 104798116 B | 4/2018 |

(Continued)

OTHER PUBLICATIONS

MIVIMEX, "What is the actual speed of flight or walking avatar?", https://community.secondlife.com/forums/topic/422397-what-is-the-actual-speed-of-flight-or-walking-avatar/, May 13, 2018 (Year: 2018).*

(Continued)

*Primary Examiner* — Michael A Cuff
(74) *Attorney, Agent, or Firm* — Fenwick & West LLP (57) ABSTRACT

A player may send virtual characters to travel to remote locations in a parallel-reality game. The remote locations are virtual locations corresponding to real-world locations other than where the player is located. The player can therefore send a virtual character to a virtual location without traveling to the corresponding real-world location themselves. A travel time and a path the character will travel along to reach the remote location is determined. Once the virtual character has reached the remote location, it stays there for a duration of time. Client devices of players near the remote location may display a visual representation of the virtual character. The virtual character may collect virtual items and interact with other players and return to the player with any virtual items it has collected or been given.

19 Claims, 6 Drawing Sheets (56) References Cited

U.S. PATENT DOCUMENTS

| | | | |
|---|---|---|---|
| 2016/0271492 A1 | 9/2016 | Mullen | |
| 2020/0054939 A1* | 2/2020 | Golden | A63F 13/35 |
| 2020/0406143 A1* | 12/2020 | Nakamura | A63F 13/65 |
| 2022/0141685 A1* | 5/2022 | Ergen | H04L 45/245 |
| | | | 370/252 |
| 2022/0150270 A1* | 5/2022 | Klein | H04L 67/12 |

FOREIGN PATENT DOCUMENTS

| | | |
|---|---|---|
| JP | 2002-282553 A | 10/2002 |
| JP | 2018-000740 A | 1/2018 |
| JP | 2018-108172 A | 7/2018 |
| JP | 2020-054451 A | 4/2020 |
| KR | 10-2018-0066369 A | 6/2018 |
| TW | I577430 B | 4/2017 |
| TW | 201825157 A | 7/2018 |
| TW | 201901615 A | 1/2019 |
| WO | WO 2017/090273 A1 | 6/2017 |
| WO | WO 2019/035193 A1 | 2/2019 |

OTHER PUBLICATIONS

Bruder et al., "Time Perception during Walking in Virtual Environments", IEEE Virtual Reality, 2014. (Year: 2014).*
PCT International Search Report and Written Opinion, PCT Application No. PCT/IB2022/052573, dated Jun. 16, 2022, 15 pages.
Japan Patent Office, Office Action, JP Patent Application No. 2021-124795, dated Nov. 1, 2022, 11 pages.
Taiwan Intellectual Property Administration, Office Action, TW Patent Application No. 111111910, dated Dec. 28, 2022, 44 pages.

* cited by examiner

TRAVEL OF VIRTUAL CHARACTERS

TECHNICAL FIELD

The present disclosure relates generally to parallel reality gaming, and more particularly, to character travel in a parallel-reality game.

BACKGROUND

Parallel reality games have a virtual geography that mirrors at least a portion of real-world geography. A parallel reality game allows players to interact with elements of the virtual world by navigating the real world. Players' characters are represented at a location in the virtual world that mirrors their location in the real world. Players may want to travel in the virtual world to visit points of interest or interact with virtual items that are not available to them at their current location. Typically, in parallel reality games, if a player wants to travel to a virtual location, they must physically move to the location in the real world that mirrors that virtual location. Under certain circumstances, a virtual element may be unavailable to player because the players cannot establish their physical presence at the corresponding real-world location. For example, if a player's location is established via GPS, it may be difficult or impossible to establish physical presence at a virtual element located within a large building. As another example, certain locations may be inaccessible at certain times due to daily opening hours, seasonal access restrictions, and the like.

SUMMARY

Parallel reality game players can send virtual characters to remote locations in the virtual world without the player having to move their real-world geographic location. The player can select a location to which the player wants the virtual character to travel. The game system determines a path for the virtual character to travel along in the virtual world to arrive at the virtual destination. At the virtual destination, a virtual character can interact with other players whose geographic location in the real world mirrors that of the geographic location of the virtual destination. For example, other players may give a virtual item or other gift to the virtual character. In some embodiments, the virtual character can also collect virtual items at the virtual destination or from locations near to its travel path. The virtual character may return to the player (e.g., by travelling along a travel path to the player who initiated its journey), bringing any items it gathered in its travel back to the player. Other exemplary implementations of the present disclosure are directed to systems, apparatus, non-transitory computer-readable media, devices, and user interfaces for providing players with a traveling virtual characters in a parallel-reality game.

These and other features, aspects and advantages may be better understood with reference to the following description and appended claims. The accompanying drawings illustrate specific embodiments and, together with the description, serve to explain various principles. However, the drawings should not be considered limiting. Rather, the scope of protection should be determined from the claims.

DETAILED DESCRIPTION

Reference now will be made in detail to various embodiments, one or more examples of which are illustrated in the drawings. Each example is provided by way of explanation of the described embodiments, not limitation of the claims. In fact, it will be apparent to those skilled in the art that various modifications and variations can be made without departing from the principles described. For instance, features illustrated or described as part of one embodiment can be used with another embodiment to yield a still further embodiment. Thus, it is intended that the present disclosure covers such modifications and variations as come within the scope of the appended claims and their equivalents.

Overview

Generally, the present disclosure relates to parallel reality games that occur in virtual worlds that are mapped to real world locations. The virtual world has experiences that relate to real world actions, such experiences incorporating virtual elements, such as virtual objects, virtual items, virtual energy, virtual characters, and other virtual elements, that can be used or collected by players of a parallel reality game having a virtual world that parallels at least a portion of the real world. In particular, the experiences in the virtual world are determined based on data associated with one or more real world actions. In this way, virtual experiences can correspond to actions in the real world that make game play more immersive. Moreover, locating virtual experiences in the virtual world based on data associated with real world actions and conditions improves the link between the parallel virtual world and the real world, further enhancing the illusion that the virtual world is another dimension of the real world that the player can perceive and interact with through the parallel reality game.

A game server can host a location-based parallel reality game having a player gaming area that includes a virtual environment with a geography that parallels at least a portion of the real-world geography. Players can navigate a virtual space in the virtual world by navigating a corresponding geographic space in the real world. In particular, players can navigate a range of coordinates defining a virtual space in the virtual world by navigating a range of geographic coordinates in the real world.

In one aspect, the positions of players can be monitored or tracked using, for instance, a positioning system (e.g. a GPS system) associated with a player's mobile computing device (e.g. cell phone, smartphone, gaming device, or other device). As players move about in the real world, player position information can be provided to the game server hosting the parallel reality game over a network. The game server can update player positions in the parallel virtual world to correspond with the player positions in the real world.

The parallel reality game can include one or more virtual elements that players can interact with during the course of the parallel reality game. To interact with virtual elements, a player may have to travel to the corresponding location of the virtual element in the real world and perform any necessary interactions in the parallel reality game. According to aspects of the present disclosure, virtual experiences can be generated in the virtual world based on data associated with real world actions. The data associated with real world actions can be analyzed to determine experiences in the virtual worlds. For instance, actions in the real world can result in experiences in the virtual world that result from the real world actions.

Tying virtual experiences to real world actions permits a more engaging experience for players. In this manner, the subject matter of the present disclosure can have a technical effect of providing for an improved computer-based implementation of a parallel reality game that provides for the generation of virtual experiences in a parallel reality game in a manner that improves the link between the real world and the parallel virtual world.

In one embodiment, a game server associated with a parallel reality game can access data associated with the location of individuals in the real world. The data associated with the location of individuals in the real world can be obtained or derived from any suitable source. The data associated with the location of individuals in the real world can include the locations of mobile device users in the real world. In particular, users of mobile devices, such as smart phones, can optionally provide position information, in terms of geographic location in the real world, in order to enhance certain location-based features or other functionality. Any information optionally provided by mobile device users can be provided on conditions of anonymity to protect the privacy of the user optionally providing the position information.

Data associated with the locations of individuals in the real world can also include data associated with the locations of players of the parallel reality game. In particular, the game server can receive position information from each of the plurality of players during play of the parallel reality game such that the game server can update the position of the player in the parallel virtual world associated with the parallel reality game.

The game server can analyze the data associated with the locations of individuals in the real world and generate a virtual experience based on such data. For instance, the game server can locate virtual elements in the virtual world for a user that are collected when that user (or another different user) travels to a particular location in the real world. In certain aspects, the virtual elements can be used to enhance an experience in the real world. For example, virtual elements can be exchanged or presented for one or more goods or services in the real world. Generation of virtual experiences in a virtual world based on real world actions can give players a reason to travel to a particular location in the real world.

In a particular implementation, certain real world actions can be directly and/or indirectly mapped to experiences in the virtual world. For instance, weather data from the real world can have a direct mapping to virtual weather in the virtual world. Similarly, weather data in the real world can be indirectly mapped to the virtual world, such as by causing certain virtual elements to be more challenging to locate when weather conditions in the real world indicate rain. As described herein, such mapping can include any real world action and can directly and/or indirectly map to one or more experiences in the virtual world, regardless of whether such experience is related to the real world action. As another example, a solar eclipse in the real world could indirectly map to the virtual world and result in a virtual experience in which virtual energy is increased for all players in the virtual world. Alternatively, or in combination with the aforementioned example, the solar eclipse could directly map to the virtual world and cause a virtual solar eclipse that is visible in the virtual world. In this way, the game server can generate virtual experiences in the virtual world from real world actions.

The game server can generate virtual experiences in the parallel virtual world based on other data associated with real world actions. For instance, the game server can create virtual experiences based on real world actions associated with items of cultural, recreational, or commercial value, map data, hazard data, weather data, event calendar data, and other suitable data. As an example, the game server can include virtual experiences in the virtual world based on actions associated with real world items corresponding to locations of public, educational, commercial, or recreational value, such as locations of public artwork, tourist attractions, scenic vistas, libraries, or hiking trails.

Other exemplary applications of data associated with real world actions can include two or more users working together in the real world to achieve one or more goals in the virtual world as a virtual experience. As an example, the virtual experiences in the virtual world can include shared virtual experiences in which two or more users assemble at a particular location in the real world. The two or more users may then collaborate to achieve a mutual objective in the virtual world.

Still other exemplary applications of data associated with real world actions can include a first user and second user that travel to a real-world location to exchange virtual elements in a virtual world between one another. The virtual elements could be messages, items, or the like. For instance, a first user can travel to a real world location and leave a virtual element in the virtual world for the second user. The second user can then travel to the location in the real world to collect the virtual element in the virtual world.

According to particular aspects of the present disclosure, two or more actions as described herein can be combined to result in one or more virtual experiences. For instance, two or more virtual elements can be distributed throughout the virtual world and require two or more users to engage in real world actions of visiting one or more real world locations to collect such virtual elements. Once users have collected all of the virtual elements, the game server can provide a virtual experience when the users assemble together at a real world location. In alterative implementations, a user can provide their respective virtual element to a different user that then assembles with the other users at a real-world location.

Virtual characters are a type of virtual element that are able to perform virtual actions. Virtual characters may be controlled by players of the parallel reality game or not, and may be representations of a player or not. A virtual character may be a virtual element that represents the player's location in the virtual world as it corresponds to the player's location in the real world. Virtual characters can interact with other virtual characters, collect and exchange items, and travel to virtual locations. The travel of virtual characters within the virtual world may be accompanied by the associated movement of a player in the real world, but does not require it. For example, a virtual character may be sent by a player to a remote location in the virtual world without a player having to move to a corresponding location in the real world. Virtual characters actions may be controlled by the player but also may be determined by the game server.

In one embodiment, a player may send a virtual character the player has collected or otherwise controls to a specified remote location (e.g., using controls displayed on a screen of their client device 120 while the game is executing to select a remote location). The remote location may be selected from among a set of possible remote locations (e.g., locations that the player has previously visited in person at some point, locations that are within a threshold distance of the player's current location, or locations that the players contacts or team members in the game have visited in person or are currently at, etc.). The virtual character may take a period of time to travel along a route from the player's current location to the remote location, impacted by factors such as a length of the route, geography along the route, weather along the route, and the like. While at the remote location, the virtual character may be visible to and interact with other players. The virtual character may return to the player who sent it to the remote location along the same route it took to get there or a different route (e.g., a route to the player's current location at the time the virtual character is returning, which may be different than the location of the player at the time that the virtual character left for the virtual location). The virtual character may return with one or more virtual items, such as gifts from other players it has interacted with, items from the vicinity of the remote location, or items from the vicinity of the route it took to or from the remote location.

Exemplary Location-Based Parallel Reality Gaming System

Exemplary computer-implemented location-based gaming systems according to exemplary embodiments of the present disclosure will now be set forth. The present subject matter will be discussed with reference to a parallel reality game. A parallel reality game is a location-based game having a virtual world geography that parallels at least a portion of the real world geography such that player movement and actions in the real world affect actions in the virtual world and vice versa. Those of ordinary skill in the art, using the disclosures provided herein, should understand that the subject matter of the present disclosure may be applied to other gaming systems. In addition, the inherent flexibility of computer-based systems allows for a great variety of possible configurations, combinations, and divisions of tasks and functionality between and among the components of the system. For instance, the systems and methods for modifying or verifying game data according to aspects of the present disclosure can be implemented using a single computing device or across multiple computing devices.

Figure 1:
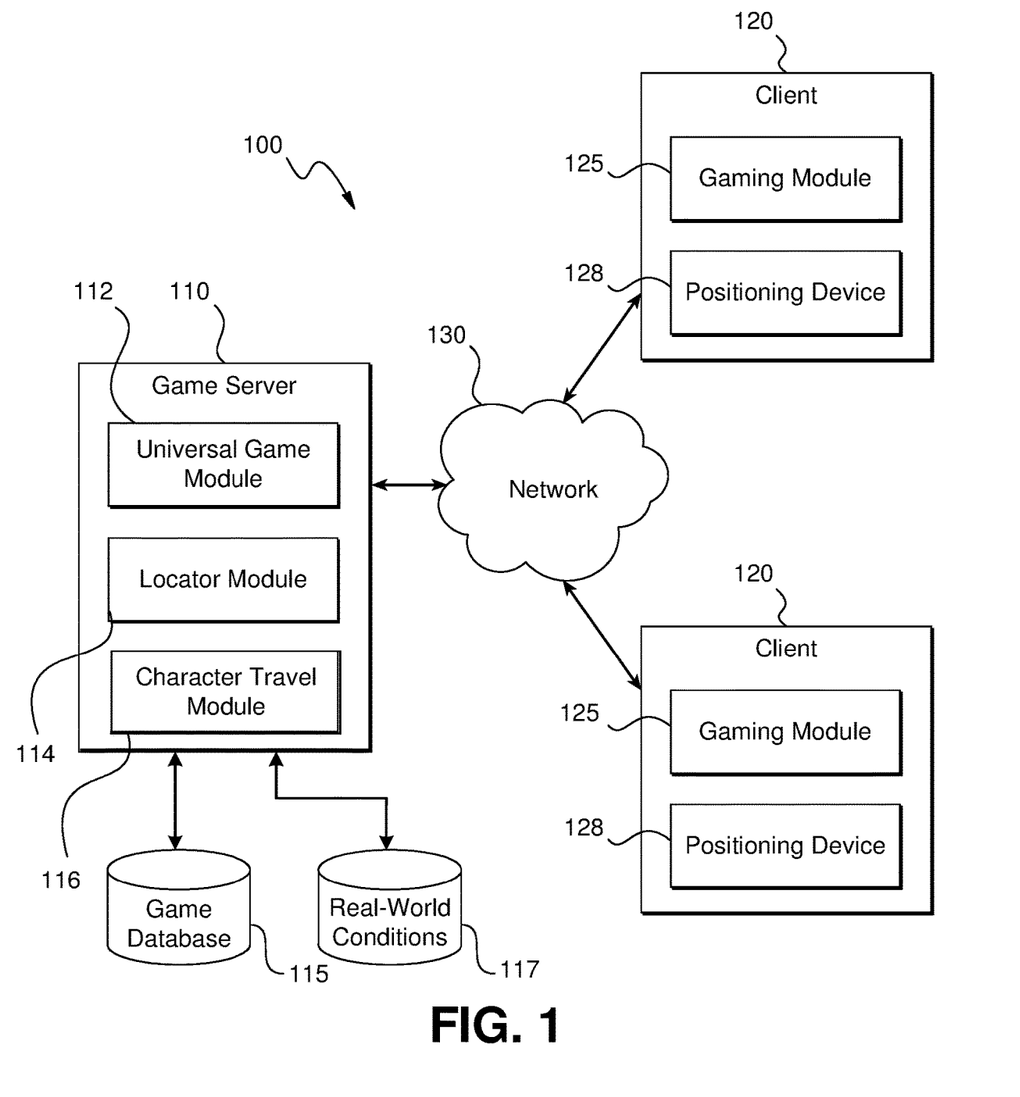
FIG. 1 depicts a computer-based system for implementing a parallel-reality game, according to one embodiment.

FIG. 1 illustrates an exemplary computer-implemented location-based gaming system 100 configured in accordance with an embodiment. The location-based gaming system 100 provides for the interaction of a plurality of players in a virtual world having a geography that parallels the real world. In particular, a geographic area in the real world can be linked or mapped directly to a corresponding area in the virtual world. A player can move about in the virtual world by moving to various geographic locations in the real world. For instance, the system 100 can track a player's position in the real world and update the player's position in the virtual world based on the player's current position in the real world.

Figure 2:
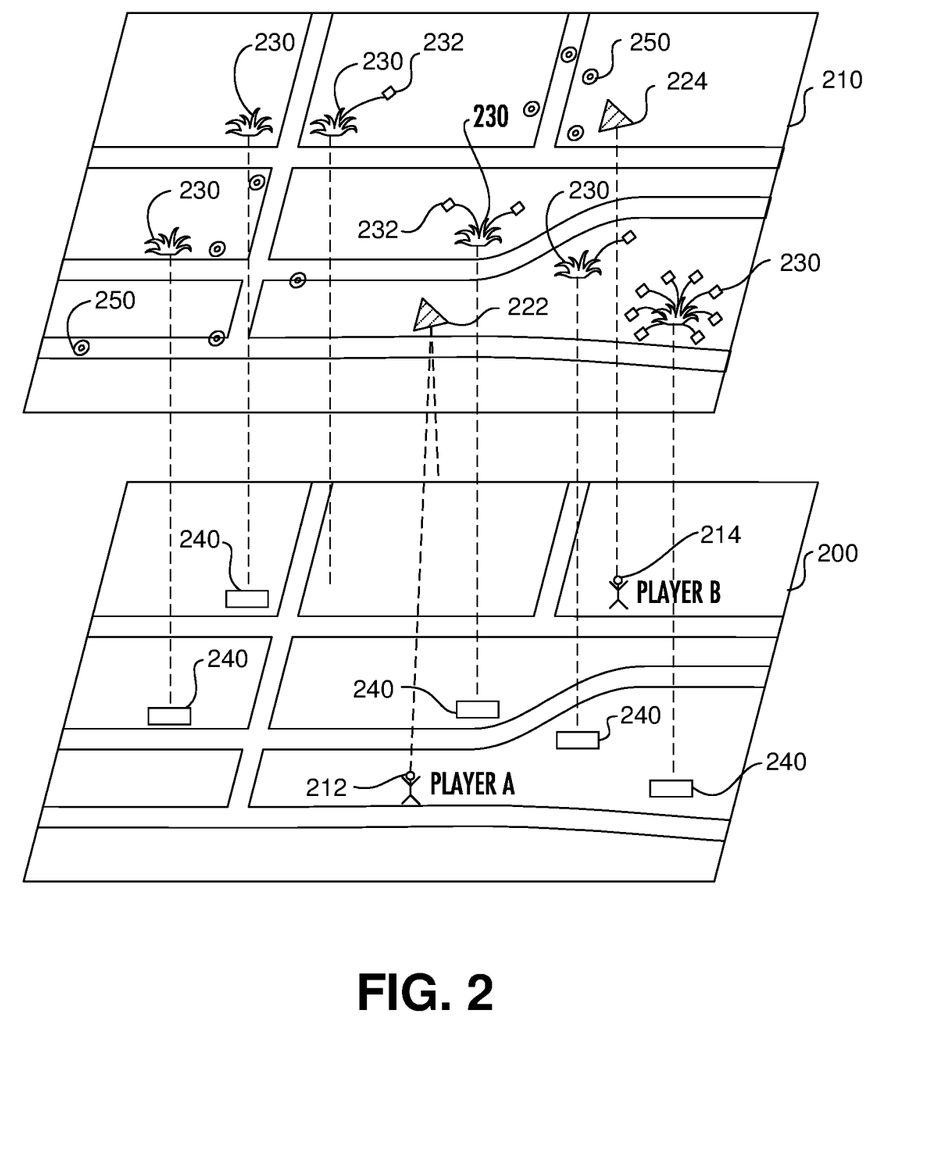
FIG. 2 depicts a representation of a virtual world having a geography that parallels the real world, according to one embodiment.

FIG. 2 depicts a conceptual diagram of a virtual world 210 that parallels the real world 200 that can act as the game board for players of a location-based game according to an exemplary embodiment of the present disclosure. As illustrated, the virtual world 210 can include a geography that parallels the geography of the real world 200. In particular, a range of coordinates defining a geographic area or space in the real world 200 is mapped to a corresponding range of coordinates defining a virtual space in the virtual world 210. The range of coordinates in the real world 200 can be associated with a town, neighborhood, city, campus, locale, a countly, continent, the entire globe, or other geographic area. Each geographic coordinate in the range of geographic coordinates in the real world 200 is mapped to a corresponding coordinate in a virtual space in the virtual world 210.

A player's position in the virtual world 210 corresponds to the player's position in the real world 200. For instance, player A, located at position 212 in the real world 200, has a corresponding position 222 in the virtual world 210. Similarly, player B, located at position 214 in the real world 200, has a corresponding position 224 in the virtual world. As the players move about in a range of geographic coordinates in the real world, the players also move about in the range of coordinates defining the virtual space in the virtual world 210. In particular, a positioning system associated with a mobile device carried by the player (e.g. a GPS system) can be used to track a player's position as the player navigates the range of geographic coordinates in the real world 200. Data associated with the player's position in the real world 200 is used to update the player's position in the corresponding range of coordinates defining the virtual space in the virtual world 210. In this manner, players can navigate a continuous track in the range of coordinates defining the virtual space in the virtual world 210 by simply traveling among the corresponding range of geographic coordinates in the real world 200 without necessarily having to check in or periodically update location information at specific discrete locations in the real world 200.

The location-based game can include a plurality of game objectives requiring players to travel to and/or interact with various virtual elements and/or virtual objects scattered at various virtual locations in the virtual world. A player can travel to these virtual locations by traveling to the corresponding location of the virtual elements or objects in the real world. For instance, a positioning system can continuously track the position of the player such that as the player continuously navigates the real world, the player also continuously navigates the parallel virtual world. The player can then interact with various virtual elements and/or objects at the specific location to achieve or perform one or more game objectives.

For example, a game objective can include players interacting with or otherwise claiming ownership of virtual elements 230 located at various virtual locations in the virtual world 210. These virtual elements 230 can be linked to landmarks, geographic locations, or objects 240 in the real world 200. The real world landmarks or objects 240 can be works of art, monuments, buildings, businesses, libraries, museums, or other suitable real world landmarks or objects. To capture these virtual elements 230, a player may travel to the landmark or geographic location 240 linked to the virtual elements 230 in the real world and interact with the virtual elements 230 in the virtual world 210. For example, player A of FIG. 2 may travel to a landmark 240 in the real world 200 in order to interact with a virtual element 230 linked with that particular landmark 240. The interaction with the virtual element 230 can be tied to action in the real world, such as taking a photograph and/or verifying, obtaining, or capturing other information about the landmark or object 240 associated with the virtual element 230. In another example, a player may send a virtual character to a landmark 240 at a particular remote virtual location so that the virtual character can interact with a virtual element 230, object 240, or other player 214 there.

Game objectives can include that players use one or more virtual items that are collected by the players in the location-based game. For instance, the players may travel the virtual world seeking virtual items (e.g. weapons, food, medical supplies, soldiers, creatures, or other items) that can be useful for completing game objectives. These virtual items can be found or collected by traveling to different locations in the real world or by completing various actions in either the virtual world or the real world. For example, players may interacts with virtual elements 230 in the virtual world to obtain virtual items. In the embodiment shown in FIG. 2, a player uses virtual items 232 to capture one or more virtual elements 230. In particular, a player can deploy virtual items 232 at locations in the virtual world 210 proximate the virtual elements 230. Deploying one or more virtual items 232 proximate a virtual element 230 can result in the capture of the virtual element 230 for the particular player or for the player's team and/or faction.

In one particular implementation, a player may gather virtual energy as part of the location-based game. As depicted in FIG. 2, virtual energy 250 can be scattered at different locations in the virtual world 210. A player can collect the virtual energy 250 by traveling to the corresponding location of the virtual energy 250 in the actual world 200. The virtual energy 250 can be used to power virtual items and/or to perform various game objectives in the game. A player that loses all virtual energy 250 can be temporarily disconnected from the game.

According to aspects of the present disclosure, the location-based game can be a massive multi-player location-based game where every participant in the game shares the same virtual world. The players can be divided into separate teams or factions and can work together to achieve one or more game objectives, such as to capture or claim ownership of a virtual element. For convenience, all such groupings of players are referred to as teams herein. In this manner, the location-based game can intrinsically be a social game that encourages cooperation among players within the game. Players from opposing teams can work against each other during the location-based game. A player can use virtual items to attack or impede progress of players on opposing teams. In some instances, players from different teams may collaborate in certain shared virtual experiences (e.g., boss battles) to achieve a common objective.

The location-based game can have various features to enhance and encourage game play within the location-based game. For instance, players can accumulate a virtual currency or other virtual reward that can be used throughout the game. Players can advance through various levels as the players complete one or more game objectives and gain experience within the game. Players can communicate with one another through one or more communication interfaces provided in the game. Players can also obtain enhanced "powers" or virtual items that can be used to complete game objectives within the game. Those of ordinary skill in the art, using the disclosures provided herein, should understand that various other game features can be included with the location-based game without deviating from the scope of the present disclosure.

Referring back FIG. 1, the illustrated computer-implemented location-based gaming system 100 includes a client-server architecture, where a game server 110 communicates with one or more clients 120 over a network 130. Although two clients 120 are illustrated in FIG. 1, any number of clients 120 can be connected to the game server 110 over the network 130. The server 110 can host a universal gaming module 112 that controls aspects of the location-based game for players and receives and processes input from players in the location based game. On the client-side, each client 120 can include a gaming module 125 that operates as a gaming application so as to provide a user with an interface to the system 100. The game server 110 transmits game data over the network 130 to the client 120 for use by the gaming module 125 at the client 120 to provide local versions (e.g. portions of the virtual world specific to player locations) of the game to players at locations remote from the game server 110.

It will be appreciated that the term "module" refers to computer logic utilized to provide desired functionality. Thus, a module can be implemented in hardware, firmware and/or software controlling a general purpose processor. In one embodiment, the modules are program code files stored on the storage device, loaded into memory and executed by a processor or can be provided from computer program products, for example computer executable instructions, that are stored in a tangible computer-readable storage medium such as RAM hard disk or optical or magnetic media.

The game server 110 can be any computing device and can include a processor and a memory. The memory can store instructions which cause the processor to perform operations. The game server 110 can include or can be in communication with a game database 115. The game database 115 stores game data used in the location-based game to be served or provided to the client(s) 120 over the network 130.

The game data stored in the game database 115 can include: (1) data associated with the virtual world in the location-based game (e.g. imagery data used to render the virtual world on a display device, geographic coordinates of locations in the virtual world, etc.); (2) data associated with players of the location-based game (e.g. player information, player experience level, player currency, player inventory, current player positions in the virtual world/real world, player energy level, player preferences, team information, etc.); (3) data associated with game objectives (e.g. data associated with current game objectives, status of game objectives, past game objectives, future game objectives, desired game objectives, etc.); (4) data associated with virtual elements in the virtual world (e.g. positions of virtual elements, types of virtual elements, game objectives associated with virtual elements, corresponding actual world position information for virtual elements, behavior of virtual elements, relevance of virtual elements, etc.); (5) data associated with real world objects, landmarks, positions linked to virtual world elements (e.g. location of real world objects/landmarks, description of real world objects/landmarks, relevance of virtual elements linked to real world objects, etc.); (6) game status (e.g. current number of players, current status of game objectives, player leaderboard, etc.); (7) data associated with player actions/input (e.g. current player positions, past player positions, player moves, player input, player queries, player communications, etc.); and (8) any other data used, related to, or obtained during implementation of the location-based game. The game data stored in the game database 115 can be populated either offline or in real time by system administrators and/or by data received from users/players of the system 100, such as from one or more clients 120 over the network 130.

As will be discussed in further detail below, the game server 110 can include or can also be in communication with a real-world condition database 117. The real-world condition database 117 can be a part of, integral with, or separate from the game database 115. The real-world condition database 117 stores data associated with real-world conditions, such as the individual and/or aggregate locations of players in the real world; actions associated with locations of cultural value or commercial value; map data providing the locations of roads, highways, and waterways; current and past locations of individual players; hazard data, weather data; event calendar data; and other suitable data. The data stored in the real-world condition database 117 can be collected or obtained from any suitable source. For example, in one aspect, the real-world condition database 117 can be coupled to, include, or be part of a map database storing map information, such as one or more map databases accessed by a mapping service. According to another exemplary aspect, the real-world condition database 117 can obtain or access data associated with past and current locations of players, for instance, from the game database 115. According to yet another exemplary aspect, the real-world condition database 117 can be coupled to one or more external data sources or services that periodically provide population data, hazard data, weather data, event calendar data, or other data to the real-world condition database 117.

The game server 110 can be configured to receive requests for game data from one or more clients 120 (for instance, via remote procedure calls (RPCs)) and to respond to those requests via the network 130. For instance, the game server 110 can encode game data in one or more data files and provide the data files to the client 120. In addition, the game server 110 can be configured to receive game data (e.g. player positions, player actions, player input, etc.) from one or more clients 120 via the network 130. For instance, the client device 120 can be configured to periodically send player input, player location, and other updates to the game server 110, which the game server 110 uses to update game data in the game database 115 to reflect changed conditions for the game.

As illustrated, the game server 110 can include a universal game module 112. The universal game module 112 hosts the location-based game for all players and acts as the authoritative source for the current status of the location-based game for all players. The universal game module 112 receives game data from clients 120 (e.g. player input, player position, player actions, player status, landmark information, etc.) and incorporates the game data received into the overall location-based game for all players of the location-based game. The universal game module 112 can also manage the delivery of game data to the clients 120 over the network 130.

In the embodiment shown in FIG. 1, the game server 110 also includes a locator module 114. The locator module 114 can be a part of or separate from the universal game module 112. The locator module 114 is configured to access data associated with real world actions, analyze the data, and determine virtual experiences in the virtual world based on the data associated with real world actions. For instance, the locator module 114 can modify game data stored in the game database 115 to locate virtual experiences in the virtual world based on the data associated with real world actions.

As shown in FIG. 1 the game server 110 can also include a character travel module 116. The character travel module 116 enables virtual characters to travel to virtual locations without requiring a player to accompany the virtual character to the location in the real world that corresponds to the virtual character's destination in the virtual world. In on embodiment, the character travel module 116 allows a player to send a virtual character to a virtual location that is associated with a remote real-world location (i.e. a real-world location that the player is not currently located at). The character travel module 116 takes inputs from the locator module 114 to determine the real-world geographic position of the player and thus the travel start point for the character. The character travel module 116 can also take inputs from the real-world conditions database 117 to determine characteristics of the character's travel such as its velocity, travel time, appearance, or interactions with virtual elements. The character travel module 116 can take inputs from and store data to the game database 115. The inputs from the game database 115 may be travel data from other character's journeys or other metrics from the virtual world. Furthermore, the character travel module 116 may output character travel data to be stored in the game database 115. Various embodiments of the character travel module 116 are described in greater detail below, with reference to FIG. 4.

Other modules can be used with the game server 110. Any number of modules can be programmed or otherwise configured to carry out the server-side functionality described herein. In addition, the various components on the server-side can be rearranged. For instance, the game database 115 can be integrated into the game server 110. Other configurations will be apparent in light of this disclosure and the present disclosure is not intended to be limited to any particular configuration.

A client 120 is any computing device that can be used by a player to interact with the gaming system 100. For instance, a client 120 can be a wireless device, a personal digital assistant (PDA), portable gaming device, cellular phone, smartphone, tablet, navigation system, handheld GPS system, or other such device. In short, a client 120 can be any computer-device or system that can execute a gaming module 125 to allow a player to interact with the virtual world.

The gaming module 125 executed by the client 120 provides an interface between a player and the location-based game. The gaming module 125 can present a user interface on a display device associated with the client 120 that displays a virtual world associated with the game and allows a user to interact in the virtual world to perform various game objectives. The gaming module 125 can also control various other outputs to allow a player to interact with the game without requiring the player to view a display screen. For instance, the gaming module 125 can control various audio, vibratory, or other notifications that allow the player to play the game without looking at the display screen. The gaming module 125 can access game data received from the game server 110 to provide an accurate representation of the game to the user. The gaming module 125 can receive and process player input and provide updates to the game server 110 over the network 130.

Because the gaming system 100 is for a location-based game, the client 120 is preferably a portable computing device, such as a smartphone or other portable device, that can be easily carried or otherwise transported with a player. A player can interact with the virtual world simply by carrying or transporting the client 120 in the actual world. The client 120 can include a positioning device 128 that monitors the position of a player during game play. The positioning device 128 can be any device or circuitry for monitoring the position of the client 120. For example, the positioning device 128 can determine actual or relative position by using a satellite navigation positioning system (e.g. a GPS system, a Galileo positioning system, the Global Navigation satellite system (GLONASS), the BeiDou Satellite Navigation and Positioning system), an inertial navigation system, a dead reckoning system, based on IP address, by using triangulation and/or proximity to cellular towers or WiFi hotspots, and/or other suitable techniques for determining position.

As the player moves around with the client 120 in the real world, the positioning device 128 tracks the position of the player and provides the player position information to the gaming module 125. The gaming module 125 updates the player position in the virtual world based on the actual position of the player in the real world. In particular, the location of the player in the virtual world can correspond to the location of the player in the real world. The gaming module 125 can provide player position information to the game server 110 over the network 130 such that the universal gaming module 112 keeps track of player positions throughout the game.

The network 130 can be any type of communications network, such as a local area network (e.g. intranet), wide area network (e.g. Internet), or some combination thereof. The network can also include a direct connection between a client 120 and the game server 110. In general, communication between the game server 110 and a client 120 can be carried via a network interface using any type of wired and/or wireless connection, using a variety of communication protocols (e.g. TCP/IP, HTTP, S1v1TP, FTP), encodings or formats (e.g. HTML, JSON, XML), and/or protection schemes (e.g. VPN, secure HTTP, SSL).

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

In addition, in situations in which the systems and methods discussed herein access and analyze personal information about users, or make use of personal information, such as location information, the users may be provided with an opportunity to control whether programs or features collect the information and control whether and/or how to receive content from the system or other application. No such information or data is collected or used until the user has been provided meaningful notice of what information is to be collected and how the information is used. The information is not collected or used unless the user provides consent, which can be revoked or modified by the user at any time. Thus, the user can have control over how information is collected about the user and used by the application or system. In addition, certain information or data can be treated in one or more ways before it is stored or used, so that personally identifiable information is removed. For example, a user's identity may be treated so that no personally identifiable information can be determined for the user.

Exemplary Game Interface

Figure 3:
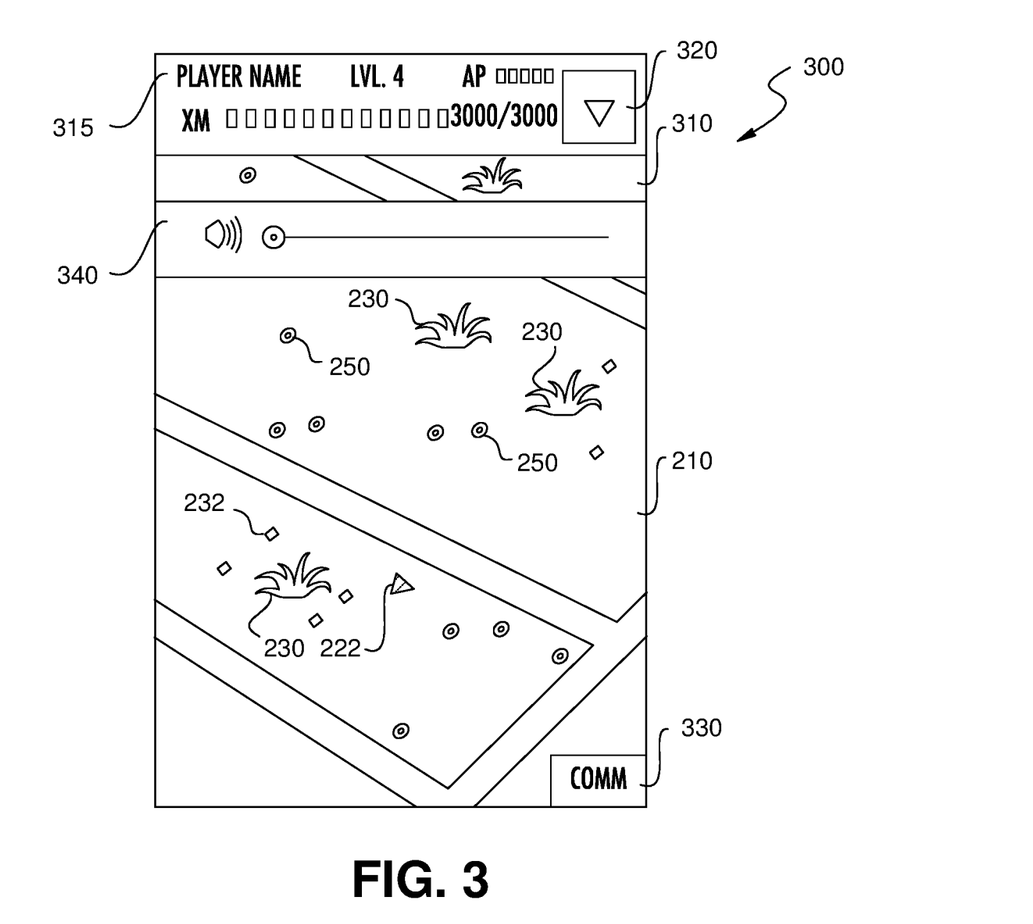
FIG. 3 depicts an exemplary game interface of a parallel-reality game, according to one embodiment.

FIG. 3 depicts one particular embodiment of a game interface 300 that can be presented on a display of a client 120 as part of the interface between a player and the gaming system 100. The game interface 300 includes a display window 310 that can be used to display the virtual world 210 and various other aspects of the game, such as player position 222 and the locations of virtual elements 230, virtual items 232 and virtual energy 250 in the virtual world 210. The user interface 300 can also display other information, such as game data information, game communications, player information, and other information associated with the game. For example, the user interface can display player information 315, such as player name, experience level and other information. The user interface 300 can include a menu 320 for accessing various game settings and other information associated with the game. The user interface 300 can also include a communications interface 330 that enables communications between the game system and the player and between one or more players of the location-based game.

According to aspects of the present disclosure, a player can interact with the location-based game by simply carrying a client device around in the real world. For instance, a player can play the location-based game by simply accessing an application associated with the location based game on a smartphone and moving about in the real world with the smartphone. In this regard, it is not necessary for the player to continuously view a visual representation of the virtual world on a display screen in order to play the location based game. As a result, the user interface 300 can include a plurality of non-visual elements that allow a user to interact with the game. For instance, the game interface can provide audible notifications to the player when the player is approaching a virtual element or object in the game or when an important event happens in the location-based game. A player can control these audible notifications with audio control 340. Different types of audible notifications can be provided to the user depending on the type of virtual element or event. The audible notification can increase or decrease in frequency or volume depending on a player's proximity to a virtual element or object. Other non-visual notifications and signals can be provided to the user, such as a vibratory notification or other suitable notifications or signals.

Those of ordinary skill in the art, using the disclosures provided herein, should understand that numerous game interface configurations and underlying functionalities will be apparent in light of this disclosure. The present disclosure is not intended to be limited to any one particular configuration.

Exemplary Character Travel Module

Figure 4:
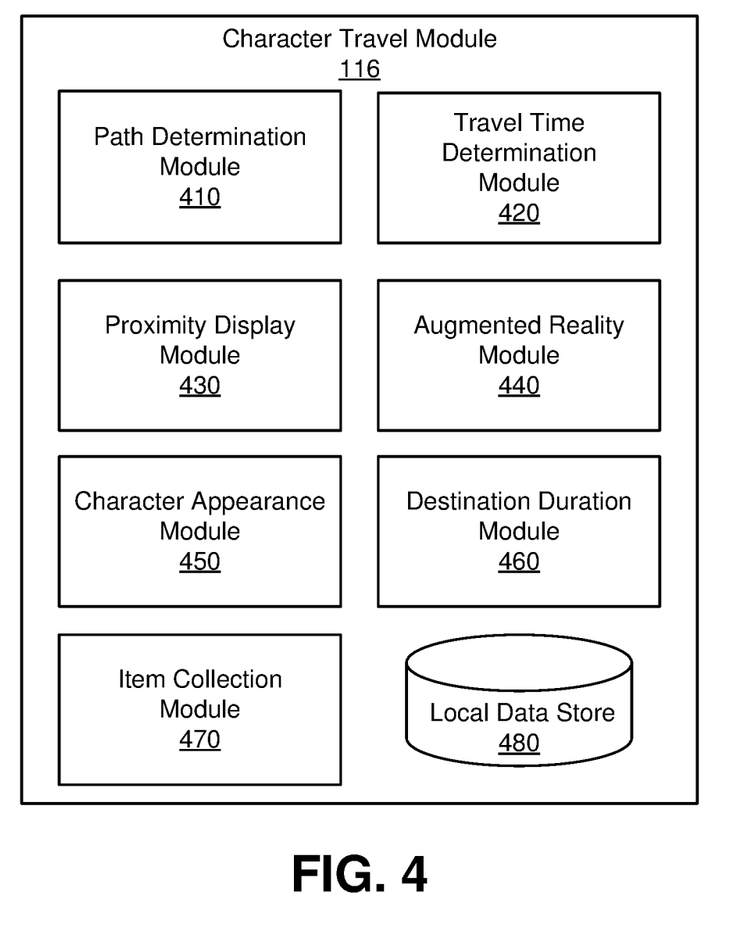
FIG. 4 is a block diagram of the character travel module of a client of FIG. 1, according to one embodiment.

FIG. 4 illustrates one embodiment of the character travel module 116 of the game server 110 of FIG. 1. In the embodiment shown in FIG. 4, the character travel module 116 includes a path determination module 410, a travel time determination module 420, a proximity display module 430, an augmented reality module 440, a character appearance module 450, a destination duration module 460, an item collection module 470, and a local datastore 480. In other embodiments, the character travel module 116 contains different and/or additional elements. In addition, the functions may be distributed among the elements in a different manner than described.

The path determination module 410 determines the route (i.e. travel path) that a virtual character will travel along to reach its desired destination, as well as the route it takes to travel from its destination back to the originating player. The path determination module 410 outputs the path it determines to one or more other modules of the character travel module 116. The path determination module 410 may use game data and real-world conditions to determine the travel path. Game data originates from the game database 115 of the game server 110. The path determination module 410 may use game data such as the locations of landmarks and other virtual elements in the virtual world or the travel paths from other virtual characters that have traveled previously. The path determination module 410 may use real world conditions such as weather or locations of businesses and other points of interest in the real world to determine the virtual character's travel path.

In one embodiment, travel paths are straight lines (i.e. arcs on a spherical world) from the character's point of origination to the desired destination that take no consideration for potential geographic obstructions present in the real world. For example, a virtual character may travel from a point in City A to a point in City B along a straight line (i.e. the shortest arc over a spherical representation of the world between the point in City A and the point in City B) and disregard buildings, mountains, rivers, etc. that intersect its path, simply traveling through them in the virtual world without being obstructed from movement.

In another embodiment, the travel path may be constrained to traversable trails (e.g., stored in the game database 115) that the character may travel along. The traversable trails may be predetermined (e.g., roads and paths indicated on a map) or inferred from player location data. Traversable trails may be inferred from player location data by identifying routes that have been traversed by players previously. For example, the set of GPS coordinates for a player crossing a park can be inferred to be a traversable trail by connecting each GPS coordinate to form a line. Inferred traversable trails may be valid for a limited period of time, such as within one hour, one day, one week, or one month, etc., of the time that the traversable trail was originally traversed. Regardless of exactly how the traversable trails are defined, they collectively define a network of trails along which virtual characters may travel, changing trails only at points where the trails intersect (or come within a threshold distance of each other). Thus, the path determination module 410 may determine the travel path for the character by finding a route through the network of traversable trails from the origination point to the destination. For example, the path determination module 410 may find the shortest path through the network of traversable trails and select it as the travel path. As another example, where the traversable trails are roads and other routes on a map, the route may be determined using a real-world routing algorithm.

In yet another embodiment, the path determination module 410 may create a travel path from the originating point to the desired destination using a collection of random GPS coordinates in the real world, requiring the character to travel to each of the coordinates representations in the virtual world by any path. The randomly selected GPS coordinates may be restricted to a region in the general vicinity of the origination location and destination. For example, the GPS coordinates may be restricted to a region that is within a threshold distance (e.g., 300 meters) of the origination point, the destination, or the straight-line route between them.

The travel time determination module 420 determines the amount of time it takes the character to travel from origination point to its destination. The travel time determination module 420 determines the time it takes for a certain distance to be traveled using one or more travel velocities of the virtual character. The travel time determination module 420 receives path information from the path determination module 410 and retrieves information from the game database 115 or real-world conditions database 117 to determine the travel velocity or velocities for the character.

In one embodiment, the travel velocity is a constant for all characters. Alternatively, each character may be assigned a travel velocity. In these cases, the travel time for the character is determined by dividing the length of the route by the velocity. In another embodiment, the velocity of the character may be impacted by one or more external factors. For example, different portions of the route may have different velocities (which may be expressed as an absolute velocity or a modifier to a default velocity for the character). The velocity for a portion of a route may be impacted by the real-world geography corresponding to that portion of the route (e.g., is the portion of the route along a road, crossing a river, inside a building, etc.). The velocity for a portion of a route may also be impacted by the weather data for the real-world region that the portion of the route goes through (e.g., the velocity of the character may be reduced by 10% if it is raining and 20% if it is snowing, etc.). Multiple external factors may combined to impact the final velocity for a portion of a route (e.g., rain may decrease the velocity of a character crossing a field by a greater amount than a character traveling along a road). Regardless of how the velocities for portions of the route are determined, the travel time determination module 420 determine the total travel time by dividing the length of each portion of the route by the corresponding velocity and summing the results.

Depending on the embodiment, the output of the travel time determination module 420 may be determined before the character sets off or updated dynamically. For example, the travel time determination module 420 may output that it will take 40 minutes for the virtual character to travel to a destination because it is traveling the equivalent of 40 real world miles at a constant velocity of 60 miles per hour. This example constitutes a constant output including a constant travel time and constant velocity. In a separate example though, the travel time determination module 420 may be active several times along the journey of the character as it encounters new game and real-world conditions. In this example, a character may travel along its path through a location that is experiencing inclement weather, resulting in the travel time determination module 420 dynamically reducing the velocity of the character at this location and thus increasing the total travel time after it has set off.

The proximity display module 430 notifies any player who is within a threshold distance of the virtual character while it is traveling or at its desired destination that the virtual character is nearby, depending on the embodiment. For convenience, players or virtual characters that are within a threshold distance (e.g., forty meters) of a location are referred to as being "at" that location. The threshold within which a player or character is determined to be at a location may vary depending on context. In one embodiment, other players may only see the virtual character at its destination during the time period between when it arrives and when it sets off to return. In another embodiment, players may additionally or alternatively see the character while it is en route to or from its destination. To enable this, the proximity display module 430 takes inputs from the path determination module 420 to determine where a virtual character is currently located on its travel path. If another player is within a threshold distance of where the character is currently located, a visual representation of the character may be displayed by that player's client 120. In some embodiments, the proximity display module 430 may generate a push notification that is sent to clients 120 of players within a threshold distance of the current or a predicted (based on the travel path) location of the character to let them know that a new virtual character is nearby and encourage them to open the game.

The augmented reality module 440 displays a virtual character to nearby players in an augmented reality environment. In one embodiment, a player that is near a traveling virtual character may enter an augmented reality mode of the game on their client 120. In this mode, images captured by a camera of the device are displayed on a screen and overlaid with one or more virtual elements, such as a virtual representation of the traveling character as though the virtual character is physically at the location. If the virtual character is traveling to or from its destination, the augmented reality module 440 may depict the visual representation of the character traveling (e.g., walking, running, flying, etc.) along its travel path. Thus, the player may be able to follow it to its destination. If the virtual character is at the remote location to which it was sent, it may be depicted at a fixed location (e.g., a point of interest to which it was sent), moving along a predetermined route around the location, or moving randomly or pseudo-randomly in the vicinity of the location (e.g., within a threshold distance such as fifty meters of a point of interest). How the character moves may be determined from a 3D map of the location (e.g., the character may walk around avoiding known obstacles).

The character appearance module 450 determines appearance attributes of the virtual character while it travels. In one embodiment, the character appearance module 450 takes inputs from the path determination module to determine where the character is or has been along its travel path. This module also takes in game data and real world conditions to determine the virtual character's appearance. For example, if a character is traveling through France currently it may appear to be hold a baguette or wear a beret, or if it is raining at the location the character is currently traveling through it may wear a raincoat, hold an umbrella, or appear to be wet. The character appearance module 450 may also take in data (e.g., from the game database 115 or real-world conditions 117) about businesses and other points of interest within a threshold distance of a virtual character (or within a threshold distance of the travel path the virtual character took). The character appearance module 450 may change the appearance of the character to relate to the surrounding businesses and points of interest or those it has passed while traveling. For example, the character may wear a bathing suit if it is near a water park or hold a lollipop if it passed by a candy store on its way to its current location.

The destination duration module 460 determines the duration of time that the virtual character stays at its desired destination. In one embodiment the originating player may determine the duration of the traveling character's stay at the desired destination when they request for the virtual character to travel and this information is stored and executed by the destination duration module 460. For example, a player may choose a desired destination for the virtual character and instruct it to stay there for one hour. The duration may also be determined by game elements or real-world conditions. Game elements that may determine the duration of the virtual character's stay at the destination include the virtual character's number of interactions with players, other virtual characters, or other virtual elements such as items or points of interest. Real-world conditions that may determine the virtual character's duration at the destination include the weather, terrain, or presence of players at the destination. The virtual character may have an objective set by the originating player that determines its duration of stay at the destination. These objectives are set by the originating player during the request to travel and may include a required number of items of collect, number of players to interact with, or other goals.

The item collection module 470 enables a character to collect items while it is traveling and while it is at its desired destination. The item collection module 470 searches for virtual items within a threshold distance of the virtual character's current location and the character may pick up identified virtual items. The virtual character may bring the virtual items it collects while traveling back to the originating player who can then add them to their inventory. In one embodiment, the character picks up any items it passes within the threshold distance of while traveling (possibly up to a maximum number of items it can carry). In another embodiment, the originating player may specify specific items or types of items they wish for the character to pick up and the character will only pick up the specified items or types of items.

The local data store 480 includes one or more computer readable media configured to store data used by the other components of the character travel module 116. In one embodiment, the local data store 480 stores a list of actions taken by the virtual character so that if writing of those actions to the game database 115 fails, the actions can be rewritten at a later time. Similarly, the actions may be transmitted to the originating player's client 120 immediately or at a later time (e.g., if the originating player has closed the game, an update of their character's action may be sent next time they open the game, or a push generation may be generated and sent to their client 120 if the virtual character performs a significant task, such as completing its journey or finding a requested item). One of skill in the art may recognize other forms of data that may be stored in the local data store 480 to improve performance and or robustness of the gaming experience.

Exemplary Character Travel Process

Figure 5:
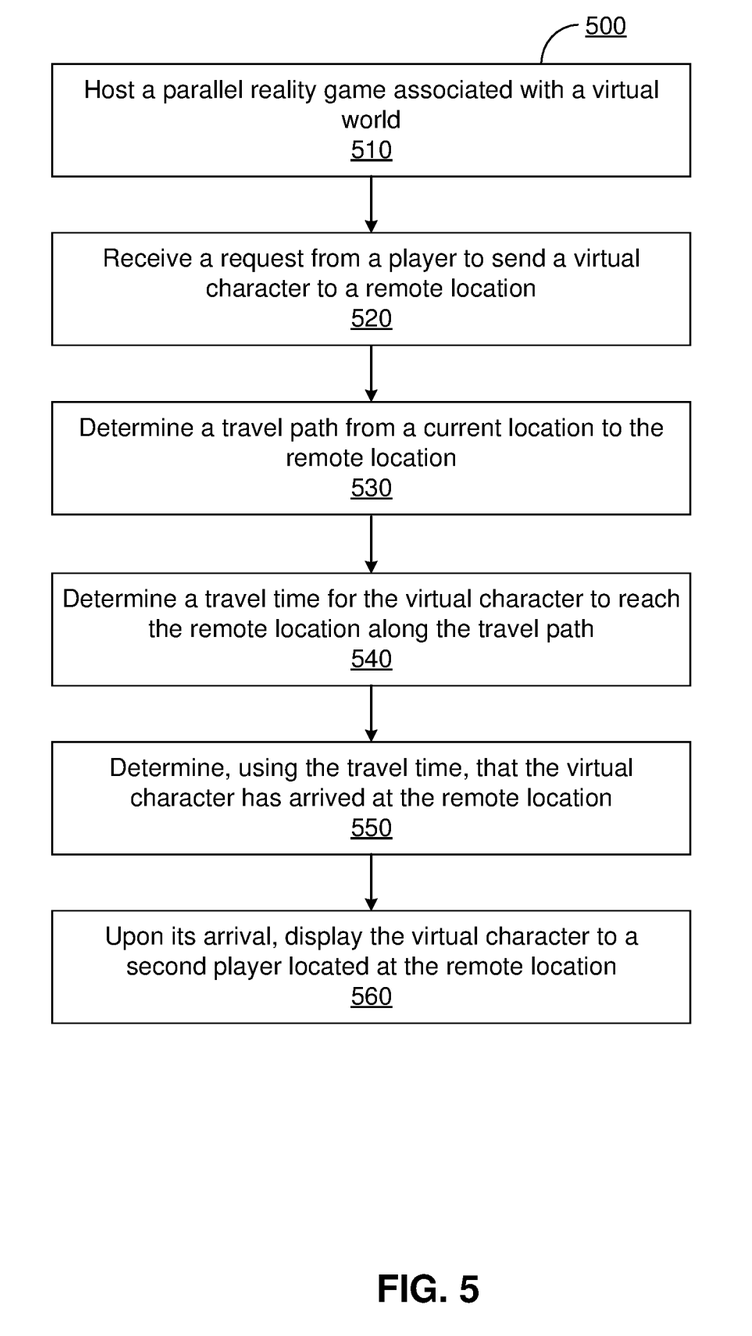
FIG. 5 is a flowchart illustrating a method for virtual character travel to remote virtual locations.

FIG. 5 is a flowchart illustrating a method 500 for virtual character travel to remote virtual locations. In the embodiment shown, the game server 110 hosts 510 a parallel reality game associated with a virtual world. In the parallel reality game, there are players that can control virtual characters and interact with and collect items using their client devices (i.e. smart phone, tablet etc.). The server 110 receives 520 a request from a client 120 of a player of the parallel reality game to send a virtual character to a remote location (e.g. a virtual representation of a real-world location at which the player is not currently located). The character travel module 116 of the game server 110 enables character travel with its sub modules.

The path determination module 410 determines 530 a travel path that the character will take to reach its desired destination (i.e. the remote location). The travel time determination module 420 determines 540 a travel time for the virtual character to reach the remote location. The travel time may be influenced by one or more factors, such as default velocity of the character, geographic features along the travel path, weather along the travel path, and previous paths taken by players, etc. After the duration of the determined travel time, the path determination module 410 determines 540 that the virtual character has arrived at the remote location. The proximity display module 430 then displays 550 the virtual character to other players located at the remote location. In some embodiments, the virtual character may also be displayed to other players while it is en route to the destination.

FIG. 5 is not a comprehensive representation of all the steps that may occur in the process of virtual character travel. Some of the steps may be performed in different orders, in parallel, or not at all. Furthermore, the method may include the use of other modules and steps before, during, or after the process flow described above. For example, while the virtual character travels to the remote location, its appearance may change based on the character appearance module 450 which draws from real world conditions and game data. A virtual character may also collect items using the item collection module 470 while it travels and during the duration of time it is at the remote location, as determined by the destination duration module 460. Additionally, a virtual character may be displayed 550 to other players at the remote location using an augmented reality module 440 and any data associated with the travel of a virtual character is stored in the local data store 480.

Once a character has traveled to the remote location specified by the originating player and stayed at the location for the determined duration, it may travel back to the originating play along the same path it took to get there or a different path that the path defemination module 410 determines. The travel time determination module 420 additionally determines the virtual character's travel time and thus velocity to travel back to the originating player. Any module that enables the virtual character to travel to a destination may also enable it to travel back to the originating player's location. The game database 115 stores data associated with the travel of virtual characters to enable later travel by the same or other characters.

Example Computing Device Architecture

Figure 6:
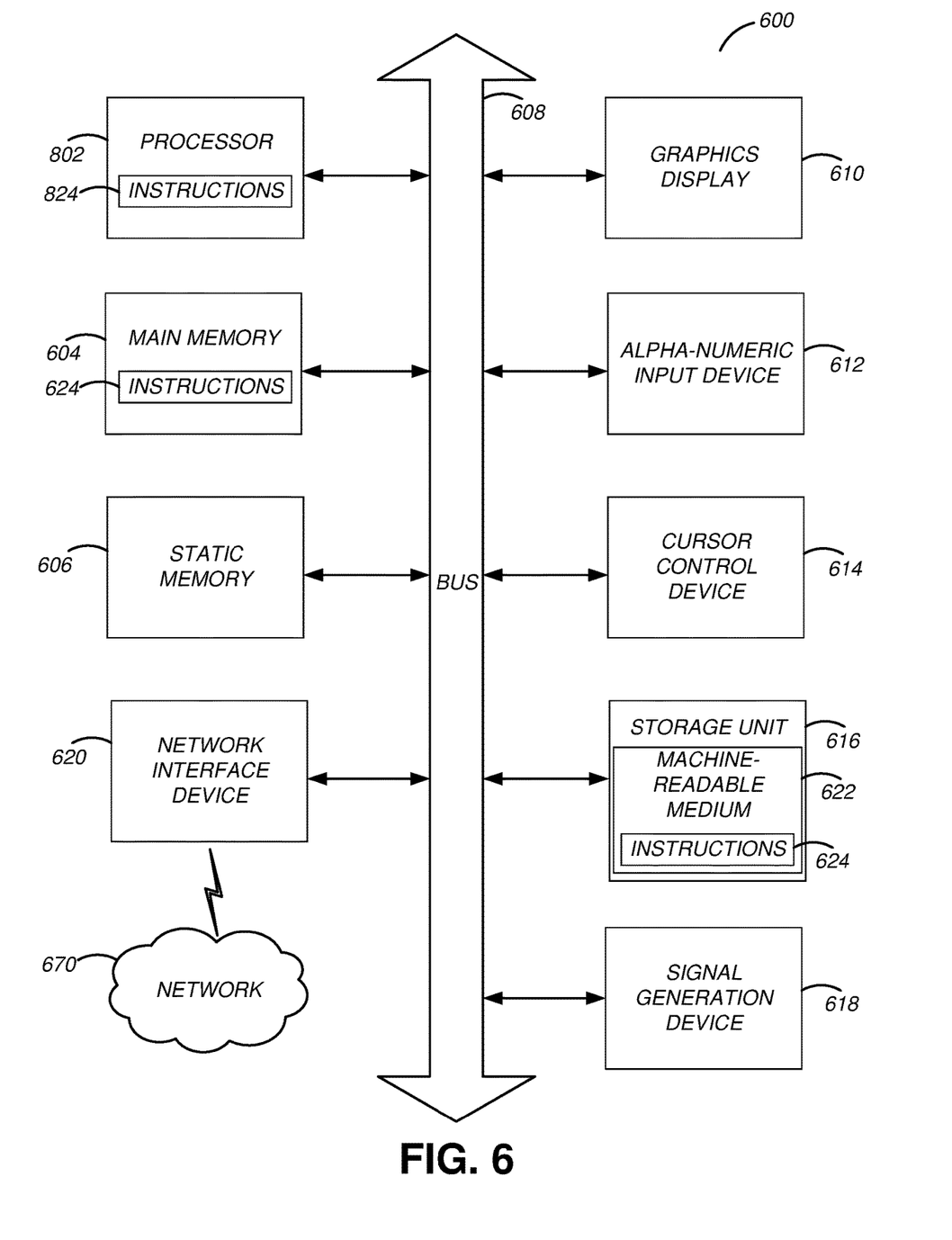
FIG. 6 is a block diagram illustrating an example computer suitable for use in the computer-based system of FIG. 1, according to one embodiment.

FIG. 6 is a block diagram illustrating components of an example machine able to read instructions from a machine-readable medium and execute them in a processor (or controller). Specifically, FIG. 6 shows a diagrammatic representation of a machine in the example form of a computer system 600. The computer system 600 can be used to execute instructions 624 (e.g., program code or software) for causing the machine to perform any one or more of the methodologies (or processes) described herein, including those associated, and described, with the components (or modules) of a game server 110 and/or client 120.

The machine may be a server computer, a client computer, a personal computer (PC), a tablet PC, a set-top box (STB), a smartphone, a network router, switch or bridge, a cell phone tower, or any machine capable of executing instructions 624 (sequential or otherwise) that specify actions to be taken by that machine. Further, while only a single machine is illustrated, the term "machine" shall also be taken to include any collection of machines that individually or jointly execute instructions 624 to perform any one or more of the methodologies discussed herein.

The example computer system 600 includes one or more processing units (generally one or more processors 602). The processor 602 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. Any reference herein to a processor 602 may refer to a single processor or multiple processors. The computer system 600 also includes a main memory 604. The computer system may include a storage unit 616. The processor 602, memory 604, and the storage unit 616 communicate via a bus 608.

In addition, the computer system 600 can include a static memory 606, a display driver 610 (e.g., to drive a plasma display panel (PDP), a liquid crystal display (LCD), or a projector). The computer system 600 may also include alphanumeric input device 612 (e.g., a keyboard), a cursor control device 614 (e.g., a mouse, a trackball, a joystick, a motion sensor, or other pointing instrument), a signal generation device 618 (e.g., a speaker), and a network interface device 620, which also are configured to communicate via the bus 608.

The storage unit 616 includes a machine-readable medium 622 on which is stored instructions 624 (e.g., software) embodying any one or more of the methodologies or functions described herein. The instructions 624 may also reside, completely or at least partially, within the main memory 604 or within the processor 602 (e.g., within a processor's cache memory) during execution thereof by the computer system 600, the main memory 604 and the processor 602 also constituting machine-readable media. The instructions 624 may be transmitted or received over a network 670 via the network interface device 620.

While machine-readable medium 622 is shown in an example embodiment to be a single medium, the term "machine-readable medium" should be taken to include a single medium or multiple media (e.g., a centralized or distributed database, or associated caches and servers) able to store the instructions 624. The term "machine-readable medium" shall also be taken to include any medium that is capable of storing instructions 624 for execution by the machine and that cause the machine to perform any one or more of the methodologies disclosed herein. The term "machine-readable medium" includes, but not be limited to, data repositories in the form of solid-state memories, optical media, and magnetic media.

ADDITIONAL CONSIDERATIONS

Some portions of above description describe the embodiments in terms of algorithmic processes or operations. These algorithmic descriptions and representations are commonly used by those skilled in the computing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality.

As used herein, any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment. Similarly, use of "a" or "an" preceding an element or component is done merely for convenience. This description should be understood to mean that one or more of the elements or components are present unless it is obvious that it is meant otherwise.

Where values are described as "approximate" or "substantially" (or their derivatives), such values should be construed as accurate+/−10% unless another meaning is apparent from the context. From example, "approximately ten" should be understood to mean "in a range from nine to eleven."

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

While the present subject matter has been described in detail with respect to specific exemplary embodiments and methods thereof it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method of enabling characters to travel in a virtual world, the method comprising:
    hosting, at a server, a parallel reality game associated with the virtual world, the virtual world having a geography that parallels at least a portion of the real world such that players can navigate the virtual world by moving to different geographic locations in the real world;
    receiving, at the server, a request from a client device of a first player to send a virtual character to a specified remote location;
    determining, using information about the virtual world, a travel time for the virtual character to reach the remote location;
    determining, using the travel time, that the virtual character has arrived at the remote location; and
    responsive to the arrival of the virtual character to the remote location, causing a representation of the virtual character to be displayed by a client device of a second player located at the remote location.

2. The computer-implemented method of claim 1 further comprising:
    determining a path for the virtual character to take in the virtual world to get to the specified remote location from its current location in the virtual world;
    updating a game database to include the path of the virtual character to the specified remote location;
    determining a travel velocity of the virtual character based on characteristics of the path; and
    enabling the virtual character to travel to the specified remote location following the determined path at the determined travel velocity.

3. The computer-implemented method of claim 2, further comprising:
    determining a real-world condition along the path of the virtual character; and
    modifying a characteristic of the representation of the virtual character based on the real-world condition.

4. The computer-implemented method of claim 3, wherein determining the real-word condition comprises querying a business database to identify a real-world business within a threshold distance of the travel path in the real world, and wherein modifying the characteristic of the virtual character comprises changing a visual appearance of the representation of the virtual character to include an item associated with the real world business.

5. The computer-implemented method of claim 2, wherein the travel path of the virtual character is a straight line from a current location of the client device of the first player to the specified remote location.

6. The computer-implemented method of claim 2, responsive to the virtual character's presence at the specified remote location for a determined period of time, causing the virtual character to travel back to the first player.

7. The computer-implemented method of claim 6, wherein the determined period of time the virtual character is at the remote location is set by the first player, random, or determined by a number of interactions the virtual character has with players at the specified remote location.

8. The method of claim 2, further comprising:
    receiving location data from client devices of players over a period of time; and
    determining, using the location data, traversable trails through the real world, at least some of the traversable trails crossing at intersection points,
    wherein determining the path for the virtual character comprises identifying a route that traverses portions of the traversable trails from the current location to the remote location, wherein the travel route shifts from a first traversable trail to a second traversable trail at an intersection point.

9. The computer-implemented method of claim 1, wherein the representation of the virtual character is displayed in an augmented reality environment, the method further comprising:
    receiving input from the client device of the second player requesting an interaction with the virtual character; and
    updating a game database to include an indication of the interaction with the virtual character.

10. The computer-implemented method of claim 9, wherein the interaction with the virtual character includes the second player giving a virtual item to the virtual character, and wherein the virtual character returns the virtual item to the first player.

11. The computer-implemented method of claim 1, wherein the travel path is a route determined using a real-world routing algorithm.

12. The computer-implemented method of claim 1, wherein the virtual character collects virtual items while it travels on a path to the specified remote location by:
    identifying a virtual item within a threshold distance of the path; and
    responsive to identifying the virtual item, updating a game database to indicate that the virtual character is carrying the virtual item.

13. A non-transitory computer-readable medium storing instruction for enabling characters to travel in a virtual world that, when executed by a computing device, cause the computing device to perform operations comprising:
    hosting a parallel reality game associated with the virtual world, the virtual world having a geography that parallels at least a portion of the real world such that players can navigate the virtual world by moving to different geographic locations in the real world;
    receiving a request from a client device of a first player to send a virtual character to a specified remote location;
    determining, using information about the virtual world, a travel time for the virtual character to reach the remote location;
    determining, using the travel time, that the virtual character has arrived at the remote location; and
    responsive to the arrival of the virtual character to the remote location, causing a representation of the virtual character to be displayed by a client device of a second player located at the remote location.

14. The non-transitory computer-readable medium of claim 13, wherein the operations further comprise:
- determining a path for the virtual character to take in the virtual world to get to the specified remote location from its current location in the virtual world;
- updating a game database to include the path of the virtual character to the specified remote location;
- determining a travel velocity of the virtual character based on characteristics of the path; and
- enabling the virtual character to travel to the specified remote location following the determined path at the determined travel velocity.

15. The non-transitory computer-readable medium of claim 14, wherein the operations further comprise:
- determining a real-world condition along the path of the virtual character; and
- modifying a characteristic of the representation of the virtual character based on the real-world condition.

16. The non-transitory computer-readable medium of claim 15, wherein determining the real-word condition comprises querying a business database to identify a real-world business within a threshold distance of the travel path in the real world, and wherein modifying the characteristic of the virtual character comprises changing a visual appearance of the representation of the virtual character to include an item associated with the real world business.

17. The non-transitory computer-readable medium of claim 14, wherein the operations further comprise:
- receiving location data from client devices of players over a period of time; and
- determining, using the location data, traversable trails through the real world, at least some of the traversable trails crossing at intersection points,
- wherein determining the path for the virtual character comprises identifying a route that traverses portions of the traversable trails from the current location to the remote location, wherein the travel route shifts from a first traversable trail to a second traversable trail at an intersection point.

18. The non-transitory computer-readable medium of claim 13, wherein the representation of the virtual character is displayed in an augmented reality environment, and the operations further comprise:
- receiving input from the client device of the second player requesting to give a virtual item to the virtual character; and
- updating a game database to include an indication of that the virtual character has the virtual item, wherein the virtual character returns the virtual item to the player.

19. The non-transitory computer-readable medium of claim 13, wherein the virtual character collects virtual items while it travels on a path to the specified remote location by:
- identifying a virtual item within a threshold distance of the path; and
- responsive to identifying the virtual item, updating the game database to indicate that the virtual character is carrying the virtual item.

* * * * *

UNITED STATES PATENT AND TRADEMARK OFFICE
CERTIFICATE OF CORRECTION

| | | |
|---|---|---|
| PATENT NO. | : 11,590,421 B2 | |
| APPLICATION NO. | : 17/215859 | |
| DATED | : February 28, 2023 | |
| INVENTOR(S) | : Konno et al. | |

It is certified that error appears in the above-identified patent and that said Letters Patent is hereby corrected as shown below:

On the Title Page

Item (57), in Column 2, under "Abstract", Line 7, delete "path the" and insert -- path of the --, therefor.

In the Claims

In Column 19, in Claim 4, Line 59, delete "real-word" and insert -- real-world --, therefor.

In Column 20, in Claim 8, Line 12, delete "method" and insert -- computer-implemented method --, therefor.

In Column 21, in Claim 16, Line 19, delete "real-word" and insert -- real-world --, therefor.

Signed and Sealed this
Third Day of September, 2024

Katherine Kelly Vidal
*Director of the United States Patent and Trademark Office*